US011465729B2

(12) United States Patent
Chaumel et al.

(10) Patent No.: US 11,465,729 B2
(45) Date of Patent: Oct. 11, 2022

(54) METHOD FOR MODULAR CONSTRUCTION OF THE FRONT PART OF AN AIRCRAFT FUSELAGE AND FLEET OF AIRCRAFT OBTAINED

(71) Applicant: Airbus Operations SAS, Toulouse (FR)

(72) Inventors: Pascal Chaumel, Plaisance du Touch (FR); Didier Reynes, Toulouse (FR); Jean-Paul Dourel, L'Union (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 491 days.

(21) Appl. No.: 16/139,806

(22) Filed: Sep. 24, 2018

(65) Prior Publication Data

US 2020/0094936 A1 Mar. 26, 2020

(51) Int. Cl.
 *B64C 1/06* (2006.01)
 *B64C 1/14* (2006.01)
 *B64F 5/10* (2017.01)

(52) U.S. Cl.
 CPC ............ *B64C 1/069* (2013.01); *B64C 1/1492* (2013.01); *B64F 5/10* (2017.01); *B64C 2211/00* (2013.01)

(58) Field of Classification Search
 CPC ... B64C 2211/00; B64C 1/069; B64C 1/1492; B64F 5/10
 See application file for complete search history.

(56) References Cited

U.S. PATENT DOCUMENTS

| 5,377,934 A * | 1/1995 | Hill ...................... B64C 27/04 244/17.11 |
| 6,070,831 A | 6/2000 | Vassiliev et al. |
| 6,213,428 B1 | 4/2001 | Chaumel et al. |
| 6,497,388 B1 * | 12/2002 | Friend .................... B64D 11/00 244/120 |
| 9,290,259 B2 * | 3/2016 | Durand ..................... B64C 1/00 |
| 11,262,749 B2 * | 3/2022 | Talavera ................. G06F 3/011 |
| 2008/0073931 A1 | 3/2008 | Mahieu et al. |

(Continued)

FOREIGN PATENT DOCUMENTS

| EP | 0857648 A2 | 8/1998 |
| EP | 0980822 A1 | 2/2000 |

(Continued)

OTHER PUBLICATIONS

French Search Report; priority document.

*Primary Examiner* — Brian M O'Hara
(74) *Attorney, Agent, or Firm* — Greer, Burns & Crain, Ltd.

(57) ABSTRACT

A method for constructing at least two fleets of aircraft of different families for which each aircraft has a front part comprising windows, a framing of the windows and a windshield front fairing, comprising, for each aircraft, constructing a module composed of the framing of all of the windows allowing outward visibility from the cockpit and of the windshield front fairing whose form is identical and constant for all the aircraft of the fleets and independent of a form of the fuselages thereof, and constructing a section of fuselage of which at least a part of an edge of the fuselage is of a form identical to an edge of the module, such that the module can be assembled directly with the contiguous fuselage section, whatever the aircraft of the fleets.

15 Claims, 2 Drawing Sheets

(56) References Cited

U.S. PATENT DOCUMENTS

| | | | |
|---|---|---|---|
| 2010/0012781 A1 | 1/2010 | Cazals et al. | |
| 2012/0292435 A1* | 11/2012 | Karem | B64C 1/00 244/49 |
| 2014/0175225 A1* | 6/2014 | Durand | B64C 1/1407 244/120 |
| 2017/0137106 A1 | 5/2017 | Bellet et al. | |
| 2021/0191392 A1* | 6/2021 | Talavera | G05D 1/0038 |

FOREIGN PATENT DOCUMENTS

| | | |
|---|---|---|
| FR | 2905669 A1 | 3/2008 |
| FR | 2933377 A1 | 1/2010 |
| FR | 3043646 A1 | 5/2017 |

* cited by examiner

METHOD FOR MODULAR CONSTRUCTION OF THE FRONT PART OF AN AIRCRAFT FUSELAGE AND FLEET OF AIRCRAFT OBTAINED

CROSS-REFERENCES TO RELATED APPLICATIONS

This application claims the benefit of the French patent application No. 1758891 filed on Sep. 26, 2017, the entire disclosures of which are incorporated herein by way of reference.

BACKGROUND OF THE INVENTION

The present invention relates to the field of the methods for constructing fuselages of aircraft dedicated, in particular, to transporting passengers and/or freight and, in particular, the front part thereof. More specifically, the present invention addresses the methods for constructing fuselages for multiple fleets of aircraft of different families and the fleets thus obtained.

Aircraft dedicated to transporting passengers and/or freight are classified by family. For each family, the aircraft have common features in terms of number of passengers, size of the aircraft or of some of its elements and, for example, diameter of the fuselage, wingspan, etc., range in terms of distance travelled implying, in particular, use for short-haul, medium-haul or long-haul flights, number of aisles in the cabin and/or any other distinctive features. These features create architectures that are different from one family to another. Thus, depending on the family, the aircraft offer different front part forms. Forms of fuselage, particularly in the area of the windows and of the windshield front fairing, that are specific to each family of aircraft result therefrom.

The patent FR2933377 filed on 1 Jul. 2008 by the present applicant relates to an airplane fuselage production method represented in a simplified manner in FIG. 1. It describes the idea that a first section 2 comprising the cockpit 4 and the electronic bay 6 dedicated to the technical applications has a high level of commonality between different airplanes. The method therefore consists in providing a second connecting section 8 of tapered section for assembling the first section 2 with the rest of the fuselage which, for its part, is of a different form depending on the airplane.

Thus, to perform the assembly with the fuselage, it is necessary to provide an intermediate section 8 allowing adaptation to the different forms of fuselage depending on the airplane model.

An aim of the present invention is to improve the construction of the front part of an aircraft by avoiding the recourse to an intermediate section and by proposing identically constructing only the area of the windows and of the windshield front fairing, the construction of which is complex.

SUMMARY OF THE INVENTION

To this end, the present invention relates to a method for constructing at least two fleets of aircraft of different families, for which each aircraft has a front part comprising windows, a framing of the windows and a windshield front fairing and the overall form of the front part is different from one family to another, characterized in that it comprises, for each aircraft:

a step of construction of a module composed of the framing of all of the windows allowing outward visibility from the cockpit and of the windshield front fairing whose form is identical and constant for all the aircraft of the fleets and independent of the form of the fuselage thereof;

a step of construction of a section of fuselage of which at least a part of the edge is of a form identical to the edge of the module such that the module can be assembled directly with the contiguous section whatever the aircraft of the fleets.

The construction method has at least one of the following optional features, taken alone or in combination.

The step of construction of the module comprises producing it so as to comprise a full panel in a single piece and in a single block.

The full panel produced is formed by the framing and by the windshield front fairing and the module is stiffened in such a way that the stiffeners are arranged differently from those of the contiguous section.

The stiffeners are arranged, at least partially, in isogrid fashion on the module and, at least partially, circumferentially on the contiguous section.

The module is produced in such a way that its bottom edge adjoins the sealed front underside of the aircraft upon assembly.

The module is produced in such a way that the top edge of the module at least partially adjoins the circumferential frame closest to the most upstream edge of the landing gear compartment upon assembly.

The present invention relates also to a fleet of aircraft of different families of which each aircraft comprises a window framing, windows and a windshield front fairing and of which the overall form of the front part is different from one family to another, characterized in that, for each aircraft, the framing of all of the windows and the windshield front fairing form a module in a single piece whose form is identical and constant for all the aircraft of one and the same family of the fleet and independent of the form of the fuselage of the aircraft, the edge of the module forming an outline identical to that of the edge of the contiguous section with which the module is directly assembled, whatever the aircraft of one and the same family of the fleet.

The fleet of aircraft has at least one of the following optional features, taken alone or in combination.

The module comprises a full panel in a single piece and in a single block.

The framing and the windshield front fairing form a stiffened full panel in which the stiffeners are arranged differently from those of the contiguous section.

The stiffeners are arranged, at least partially, in isogrid fashion on the module and, at least partially, circumferentially on the contiguous section.

The bottom edge of the module adjoins a sealed front underside.

The top edge of the module, at least partially, adjoins the circumferential frame closest to the most upstream edge of the landing gear compartment.

BRIEF DESCRIPTION OF THE DRAWINGS

Other aims, advantages and features of the invention will become apparent on reading the following description of the invention, given by way of nonlimiting example with reference to the attached drawings in which.

DETAILED DESCRIPTION OF THE PREFERRED EMBODIMENTS

Figure 2:
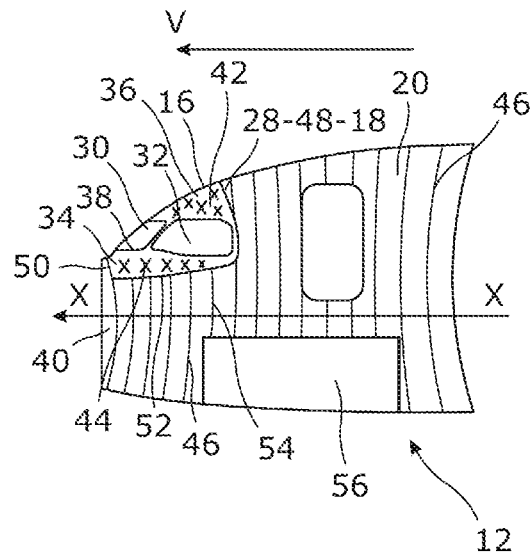
FIG. 2 represents a schematic and simplified side and internal view of a front part of an aircraft according to the present invention cut along a vertical longitudinal median plane.
Figure 3:
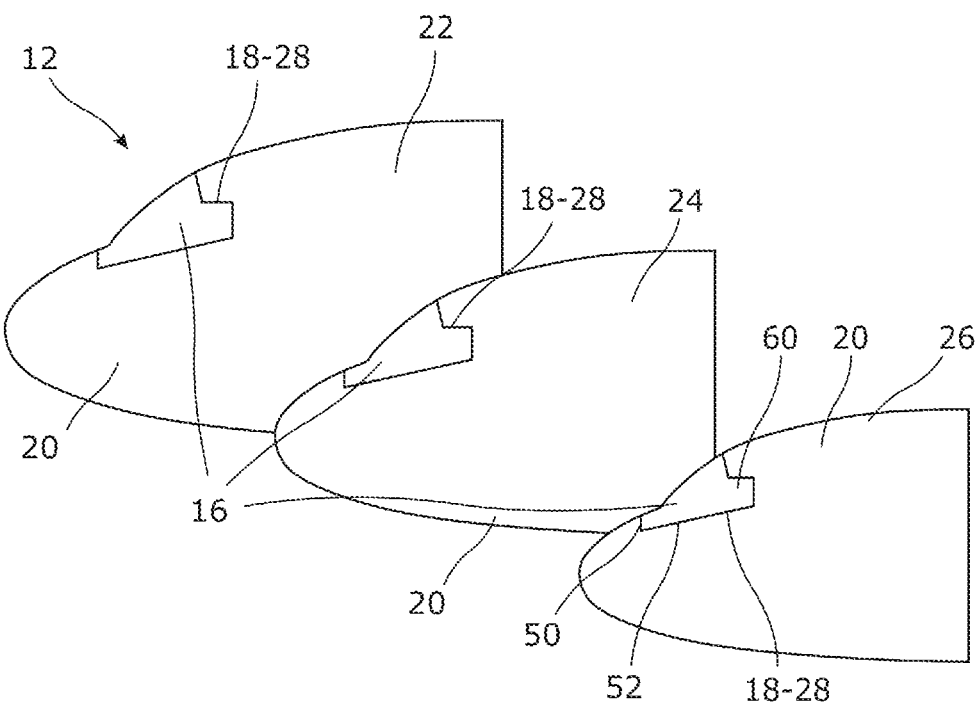
FIG. 3 represents a schematic and simplified side and outer view of a front part of three aircraft of different families according to an embodiment of the invention different from that represented in FIG. 2.
Figure 6:
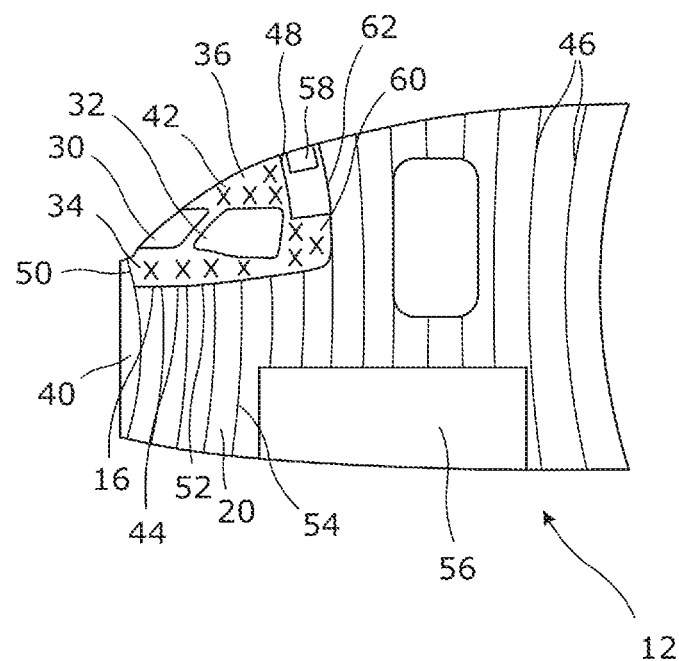
FIG. 6 represents a schematic and simplified side and internal view of a front part of an aircraft according to the embodiment of FIGS. 3 to 5 cut along a vertical longitudinal median plane.

The present invention relates to the construction of an aircraft fuselage and more particularly, as FIGS. 2, 3 and 6 show, of the front part 12 of the fuselage. The terms front and rear are considered in relation to the direction of displacement of the aircraft in flight represented by the arrow V in FIG. 2. Hereinafter in the description, the aircraft is assumed to be standing on a horizontal ground, any plane at right angles to the ground being, therefore, vertical.

An aircraft of known type is divided into sections, each section being formed by a portion of fuselage delimited by two parallel transverse planes that are vertical and at right angles to the longitudinal direction of the aircraft corresponding to the direction of the axis X-X in FIG. 2. The sections are assembled with one another at two connecting sections located in the abovementioned delimiting planes at the two free ends of the section, apart from the front and rear parts, for which only one connecting section is provided.

The front and rear parts have a different form given the progressively decreasing dimensions of the fuselage up to a point of nil section corresponding to the front and the rear end of the fuselage. Between the front and rear parts, the central part of the aircraft has, in most cases, a virtually non-tapered form, for example of oval or circular cylindrical section. In some families, the central part of the aircraft also has one or more parts with a tapered section. Thus, for example, in a sailwing or an aircraft with integrated fuselage, the central part is tapered. It should be noted that in the present description, for reasons of simplification, the term aircraft covers the sailwing and the aircraft with integrated fuselage. The front and rear parts of the aircraft can also comprise one or more parts with a substantially non-tapered section.

Figure 1:
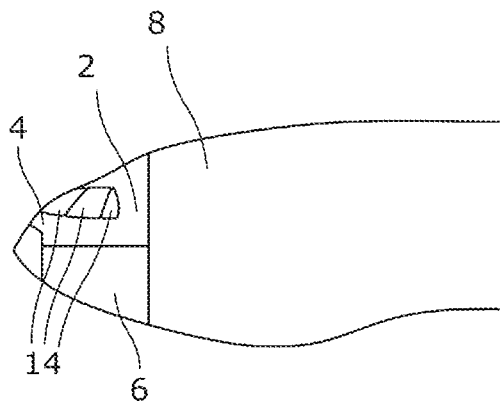
FIG. 1 represents a schematic and simplified outer side view of a front part of an aircraft according to the prior art.

It is necessary to maintain a determined pressure inside the aircraft during the flight, at altitudes where the outside pressure is greatly different from that required for the individuals on board. It is also important to protect the pilot and copilot against impacts from birds, stones, or various other types of objects. The consequence is that different stresses are applied to the front part of an aircraft which render the design thereof complex in order to ensure at the same time strength, rigidity and solidity, while allowing a certain flexibility to absorb the impacts. Furthermore, an additional difficulty is added with the openings formed in the fuselage for the insertion of the windows. Hereinafter throughout the description, the term window denotes a window of the cockpit. In most aircraft, a central window and a plurality of side windows are provided to ensure visibility for the pilots and copilots outward from the cockpit. In the example of the aircraft according to FIG. 1, four side windows 14 are provided (only two are visible because of the side view). With the in-flight pressurization, the openings weaken the structure and the loads applied to the windows are significant. It is necessary to reinforce the structure at the periphery of the windows using a specific framing and stiffeners, the location and the placement of which are conceived to optimize the number and the weight thereof. The design and construction of the area around the windows and of the windshield front fairing is therefore complex given the stresses and forces present.

The windshield front fairing in aeronautics is a term commonly accepted denoting the panel extending from the windows to a structural frame of the aircraft. The windshield front fairing exhibits a domed form to guarantee a good aerodynamic flow. The windshield front fairing, given its positioning, has to withstand the various stresses and forces set out above such as, for example, bird impact or weather stresses of various types to protect the cockpit and, because of this, has a reinforced structure to withstand the ingress of foreign bodies.

The window framings provide the interface between the windows and the fuselage of the cockpit, namely the link with the panels located at the periphery of the windows ensuring the securing thereof in the face of all the stresses and forces mentioned above such as, for example, the pressurization and impacts of all kinds.

The present invention comprises making this area of the windshield front fairing and of the framing of the windows modular. By exhibiting a single designed form, the module 16 produced is taken up for several aircraft and more widely for at least two fleets of aircraft of different families Hereinafter in the description, the term fleet denotes a set of at least two aircraft; this set is distinguished, for example, by the fact of belonging to one and the same airline, or, according to another example, by the fact of being registered in one and the same country or any other feature distinguishing it from another set. The term family has been defined above. The module 16 is identical whatever the aircraft of the fleets concerned. It forms the first section whose outlines 18 correspond to the outline of the second section 20 for a direct assembly without requiring any intermediate connecting section. The second section of each of the aircraft of the fleets concerned has a form such that one of its free ends has outlines matching the module of the first section.

FIG. 3 represents three nose cones 22, 24, 26 of aircraft of different families. The outlines 18 of the module 16 are represented, highlighting the modular aspect regardless of the family. It is clearly visible that the module 16 is identical across the three families of aircraft. The overall form of the front part 22, 24, 26 on the other hand is different from one family to another and is adapted to the outlines 18 of the module. The outlines 18 of the module correspond to the outlines 28 of the contiguous section for a direct assembly with one another.

The modular aspect of the area that is most complex to produce structurally in the front part of the fuselage makes it possible to reduce the development and maintenance costs. It also makes it possible to simplify the training of the pilots, the modularity allowing the latter to at least partially find one and the same environment, and above all in terms of the windows which ensure the outward visibility. Finally, it ensures an outer visual signature across all the multiple fleets of aircraft of an airline.

Figure 4:
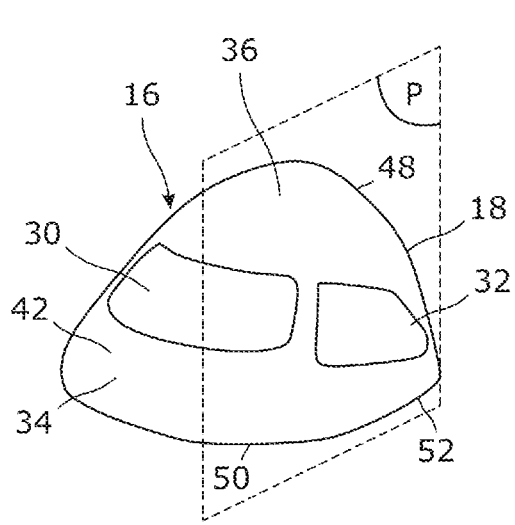
FIG. 4 represents a schematic and simplified perspective view of the module according to the embodiment of the invention of FIG. 3.
Figure 5:
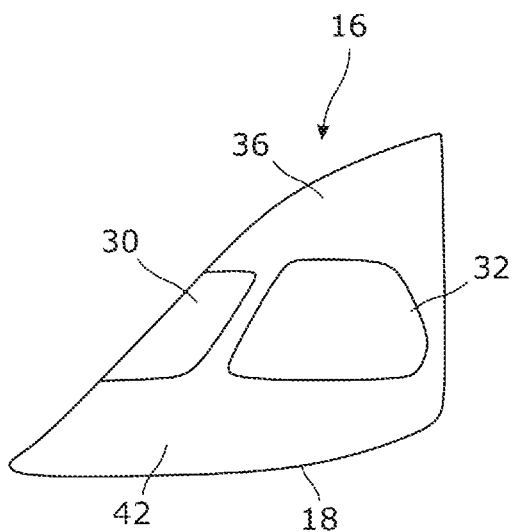
FIG. 5 represents a schematic and simplified side perspective view of the module of FIG. 4.

FIGS. 4 and 5 represent the module 16 on its own. The module 16 encompasses the set of the windows 30, 32, their framing 34 and the windshield front fairing 36. In order to improve the outward visibility, only three windows are provided: a central window 30 and two side windows (of which only one 32 is represented because of the side view).

In the embodiment illustrated in FIGS. 2 and 6, the central window 30 is of a height such that the framing 34 of the bottom edge 38 of the window 30 adjoins the top part of the sealed front underside 40.

The aircraft has an overall vertical central plane of symmetry P (represented in FIG. 4) passing through the central longitudinal axis X-X of the aircraft. The plane P of symmetry splits the module into two parts. The front-end window is symmetrical relative to the plane P. The side windows (of which only the window 32 is visible) are symmetrical relative to the plane P. The form of the actual module is symmetrical relative to the plane P.

In the embodiment illustrated in FIGS. 2 to 6, the module 16 is produced from a full panel 42 in a single piece, in a single block. The panel 42 can be constructed by a method of known type by explosive forming or by rolling. Stiffeners 44 are machined or added onto the panel 42 produced. The stiffeners 44 of the panel 42 can exhibit any type of geometry. In the embodiment illustrated, they are arranged relative to one another according to a different geometry from that used for the stiffeners 46 of the contiguous section: the stiffeners 44 of the module 16 have an at least partially isogrid structure whereas the stiffeners 46 of the contiguous section 20 are positioned circumferentially. It is, however, possible for the stiffeners of the contiguous section to be positioned in any other way. The panel 42 being a full panel, and the specific forces applied being as seen above, the isogrid structure makes it possible to offer the desired strength and flexibility.

In the embodiment illustrated in FIGS. 2 and 4, the module 16 has a top edge 48 in the form of an arc: the edge 48 follows the outline of the windshield front fairing 36. The top edge 48 of the module 16 at least partially adjoins the circumferential frame 54 closest to the most upstream edge of the landing gear compartment 56. The module 16 also comprises a bottom edge 50 in the form of an arc which, in the embodiment illustrated, follows the outline of the sealed front underside 40. The ends of the top edge 48 are joined to the ends of the bottom edge 50 by a lateral rectilinear edge 52 providing the outline of the framing of the windows. The lateral edge 52 of the module is not horizontal but inclined relative to a horizontal plane: relative to a horizontal plane, the edge descends from one end to the other in the direction of the arrow V. In the embodiment illustrated, it starts from the sealed front underside 40 and goes up in the example illustrated at least up to the circumferential frame 54 closest to the most upstream edge of the landing gear compartment 56.

In the embodiment illustrated in FIGS. 3 to 6, the front part 12 comprises a cockpit escape hatch 58 in the top part of the fuselage above the windshield front fairing 36. In this configuration, the form of the module 16 varies slightly. Similarly, the module 16 has a top edge 48 in the form of an arc: the edge 48 follows the outline of the windshield front fairing 36. The module 16 also comprises a bottom edge 50 in the form of an arc which, in the embodiment illustrated, follows the outline of the sealed front underside 40. The ends of the top edge 48 are joined to the ends of the bottom edge 50 by a lateral rectilinear edge 52 providing the outline of the framing of the windows. The lateral edge 52 of the module is not horizontal but inclined relative to a horizontal plane: it starts from the sealed front underside 40 and goes up in the example illustrated at least up to the circumferential frame 54 closest to the most upstream edge of the landing gear compartment 56. A quadrangular appendage 60 is provided on each side of the module 16 symmetrically relative to the plane P. Each appendage 60 extends the module 16 from the top edge 48 to the frame 62 closest to the downstream edge of the top escape hatch 58. The lateral edge 52 of the module 16 is rectilinear up to the downstream end of the appendage 60: the bottom side of the appendage 60 forms part of the lateral edge 52 of the module 16. The top edge 48 of the appendage 60 is located above the windows 30, 32. The appendage 60 is clearly visible in FIG. 3 and offers a single outer visual signature for all the aircraft of the families concerned.

The example of the appendage 60 is given by way of illustration to show that the geometry of the windshield front fairing can be varied.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for constructing a first family of aircrafts and a second family of aircrafts for which each aircraft in each family has a front part comprising windows, a framing of the windows and a windshield front fairing, comprising the steps, for each aircraft:
   constructing a module composed of the framing of all of the windows allowing outward visibility from the cockpit and of the windshield front fairing whose form is identical and constant for all the aircraft in the first family of aircrafts and the second family of aircrafts and independent of a form of a fuselage thereof, said module being taken up for all of said aircraft of the first family of aircrafts and the second family of aircrafts, the module being identical whatever the aircraft of the first family of aircrafts or the second family of aircrafts concerned, wherein an overall form of the front part being different from the first family if aircrafts compared to the second family of aircrafts;
   constructing a section of fuselage to be contiguous to the module, of which at least a part of an edge of the fuselage section is adapted to the outlines of the module and is of a form identical to an edge of said module, such that the module can be assembled directly with the contiguous fuselage section, whatever the aircraft of the first family of aircrafts or the second family of aircrafts,
   wherein the module comprises an arc-shaped top edge transverse to a plane extending along a central longitudinal axis of each aircraft and an arc-shaped bottom edge transverse to the plane extending along the central longitudinal axis each aircraft, wherein a length of the arc-shaped top edge is greater than a length of the arc-shaped bottom edge.

2. The construction method according to claim 1, wherein the step of constructing the module comprises producing the module so as to comprise a full panel in a single piece and in a single block.

3. The construction method according to claim 2, wherein the full panel produced is formed by the framing and the windshield front fairing and the module is stiffened in such a way that module stiffeners are arranged differently from stiffeners of the contiguous fuselage section.

4. The construction method according to claim 3, wherein the stiffeners are arranged at least partially in isogrid fashion on the module and at least partially circumferentially on the contiguous fuselage section.

5. The construction method according to claim 1, wherein the module is produced in such a way that the bottom edge of the module adjoins a sealed front underside of each aircraft upon assembly.

6. The construction method according to claim 1, wherein the module is produced in such a way that the top edge of the module at least partially adjoins a circumferential frame closest to a most upstream edge of a landing gear compaitment upon assembly.

7. A first family of aircrafts and a second family of aircrafts of which each aircraft in the first family of aircrafts and the second family of aircrafts has a front part comprising:
a window framing,
windows, and
a windshield front fairing, and
wherein, for each aircraft, said window framing of all of the windows and said windshield front fairing, form a module in a single piece whose form is identical and constant for all the aircraft in the first family of aircrafts and the second family of aircrafts and independent of a form of a fuselage of each aircraft, said module being taken up for each aircraft of the first family of aircrafts and the second family of aircrafts, the module being identical whatever the aircraft of the first family of aircrafts and the second family of aircrafts concerned, in the first family of aircrafts and the second family of aircrafts, the overall form of the front part being on the other hand different from the first family of aircrafts compared to the second family of aircrafts and adapted to the outlines of the module, an edge of said module forming an outline identical to that of an edge of a contiguous section of the fuselage with which the module is directly assembled, whatever the aircraft of the first family of aircrafts or the second family of aircrafts,
wherein the module comprises an arc-shaped top edge transverse to a plane extending along a central longitudinal axis of each aircraft and an arc-shaped bottom edge transverse to the plane extending along the central longitudinal axis each aircraft, wherein a length of the arc-shaped top edge is greater than a length of the arc-shaped bottom edge.

8. The first family of aircrafts and the second family of aircrafts according to claim 7, wherein the module comprises a full panel in a single piece and in a single block.

9. The first family of aircrafts and the second family of aircrafts according to claim 8, wherein the framing and the windshield front fairing form a stiffened full panel in which module stiffeners are arranged differently from stiffeners of the contiguous fuselage section.

10. The first family of aircrafts and the second family of aircrafts according to claim 9, wherein the stiffeners are arranged at least partially in isogrid fashion on the module and at least partially circumferentially on the contiguous fuselage section.

11. The first family of aircrafts and the second family of aircrafts according to claim 7, wherein the bottom edge of the module adjoins a sealed front underside of the aircraft upon assembly.

12. The first family of aircrafts and the second family of aircrafts according to claim 7, wherein the top edge of the module at least partially adjoins a circumferential frame closest to a most upstream edge of a landing gear compartment.

13. The construction according to claim 1, wherein the module is produced from a full panel in a single piece.

14. The construction according to claim 1, wherein a form of the module is symmetrical relative to the plane extending along a central longitudinal axis each aircraft of each aircraft.

15. The construction according to claim 3, wherein the framing and the windshield front fairing form a stiffened full panel in which module stiffeners are arranged differently from stiffeners of the contiguous fuselage section.

* * * * *

UNITED STATES PATENT AND TRADEMARK OFFICE
CERTIFICATE OF CORRECTION

| | |
|---|---|
| PATENT NO. | : 11,465,729 B2 |
| APPLICATION NO. | : 16/139806 |
| DATED | : October 11, 2022 |
| INVENTOR(S) | : Pascal Chaumel et al. |

It is certified that error appears in the above-identified patent and that said Letters Patent is hereby corrected as shown below:

On the Title Page

Item (30) Please insert the following:
--(30) Foreign Application Priority Data
Sept. 26, 2017 (FR).............................. 1758891--

Signed and Sealed this
First Day of August, 2023

Katherine Kelly Vidal
*Director of the United States Patent and Trademark Office*